United States Patent Office 2,856,267
Patented Oct. 14, 1958

2,856,267
RECOVERY OF HYDROGEN SULPHIDE FROM WASTE SLUDGE ACID

Jonas Kamlet, Easton, Conn.

No Drawing. Application April 12, 1954
Serial No. 422,651

14 Claims. (Cl. 23—181)

This invention relates to a process for the recovery of values from waste sludge acid. More particularly, it relates to a simplified process whereby the free and combined inorganic and organic sulfuric and sulfonic acids present in the sludge acid obtained as a waste product in the treatment and refining of petroleum distillates and in the treatment, refining or purification of coal tar distillates may be recovered in good yield in the form of hydrogen sulfide gas or elemental sulfur. It has for its purpose primarily to provide a simplified process for the recovery of values from waste sludge acids which may be effected with relatively inexpensive equipment and without excessive manipulation and which does not involve the simultaneous conversion of such recovered values to sulfuric acid. Most processes now available for the recovery of values from waste sludge acid involve the obtention of a sulfur dioxide-containing gas from the decomposition of said sludge acid and the installation of a plant for the conversion of this sulfur dioxide to sulfuric acid. Current plant practice in the United States indicates that a minimum capacity of 25 to 50 tons a day of sulfuric acid is usually necessary for economical operation, so that many smaller plants are not in a position to recover sulfuric acid from their waste sludge acids by this procedure. It is the purpose of this invention to provide a process which may be economically operated on any desired scale for the treatment of sludge acids, obtained in any amount from the processing of petroleum or coal tar distillates, whereby the sulfuric and sulfonic acid contents of said waste sludge is recovered in the form of hydrogen sulfide gas or solid elemental sulfur, both valuable and readily salable articles of commerce.

Waste sludge acids from the refining of petroleum or coal tar distillates are usually extremely complex in nature and vary considerably in composition. As a rule, these waste sludge acids contain a considerable quantity of free sulfuric acid and in addition one or more of the following types of compounds: alkylsulfonic acids from the sulfonation of unsaturated hydrocarbons, alkyl sulfuric acids from the hydration of unsaturated hydrocarbons and sulfonation of the resultant alkanols, oxidized and sulfonated paraffins, oxidized and sulfonated naphthenes, aromatic hydrocarbon sulfonic acids, oxidation products of naphthenes, hydrocarbons, phenols, etc., sulfuric acid salts of tarbases such as the pyridines, picolines, bitumens, quinolines, aromatic amines and their ring-hydrogenated derivatives, asphaltic, resinous and carbonaceous materials of unknown origin, fusain and vitrain carbon.

Waste sludge acids from petroleum refining usually falls in one of the following categories:

(a) Liquid sludge from refining of gasoline and kerosene, (b) Light lubricating oil sludge—a viscous, black, pitch-like fluid which oxides readily and solidifies slowly on cooling, and (c) Heavy lubricating oil and paraffin sludge—a very viscous, dense pitch-like product which solidifies rapidly on cooling and must be handled hot to remain fluid.

Waste sludge acids from the processing of coal tar distillates are obtained chiefly as a by-product of the sulfuric acid washing of light oils to remove sulfur-containing and unsaturated organic compounds, but may also be obtained as a by-product of other operations in a coal tar distillation plant. Its disposal now presents a formidable problem, especially in smaller plants where not enough sludge is produced to justify the installation of any of the sludge acid disposal processes heretofore developed.

Processes heretofore developed for the recovery of values from waste sludge acids involve the recovery of weak sulfuric acid by open tank separation, by pressure separation and by pressure digestion of partially separated acid (Kalichevsky, Chemical Refining of Petroleum (1933), pp. 94–99; Davis and Davis, U. S. Patent 1,511,721 (1924); Halloran, Davis and Davis. U. S. Patent 1,604,641 (1926), and 1,752,555 (1930); Heckenbleikner and Oliver, U. S. Patents 1,586,801 (1926) and 1,599,360 (1926)), or by the reduction of the sulfuric and sulfonic acids by the hydrocarbons present in the sludge to a sulfur dioxide-containing gas which is then converted to sulfuric acid, usually in a contact acid installation at the site. (Benzason, U. S. Patent 1,459,084 (1923), Black and Chappell, U. S. Patent 1,031,413 (1912), Blowski and Blowski, U. S. Patents 1,010,221 (1911) and 1,186,373 (1916); Chemical Construction Corp., French Patents 743,624 (1931) and 784,147 (1933), English Patent 398,023 (1931); Egloff, U. S. Patent 1,535,213 (1925); Heckenbleikner, U. S. Patents 1,264,509 (1918), 1,264,182 (1918), 1,900,239 (1933) 1,953,225 (1934), 1,953,226 (1934), 1,958,402 (1934); Hinde, U. S. Patent 1,776,070 (1930); Robinson, U. S. Patents 1,014,520 (1912) and 1,057,395 (1913); Schildhaus and Condrea, U. S. Patent 956,184 (1910); Southby, English Patent 1,909 of 1868; Stark, English Patent 12,028 of 1889 and Steau Romana, German Patent 224,566 (1910).) I know no process in the prior art whereby the acid values of waste sludge acid may be recovered as hydrogen sulfide or elemental sulfur.

The basis of my invention is the following sequence of steps:

(a) The waste sludge acid is mixed with an alkali-metal or alkaline earth metal sulfide, in quantity at least sufficient to neutralize all of the free inorganic and organic sulfuric and sulfonic acids in the sludge. The reaction is rapid and substantially quantitative. The free sulfuric acid reacts with the sulfide salt as follows:

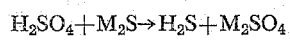

(where M is an equivalent of an alkali metal or an alkaline earth metal). The free organic sulfonic and sulfuric acids react with the sulfide salt as follows, e. g.:

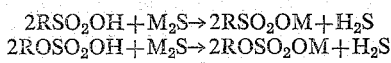

(where R represents the organic portion of said acids). The hydrogen sulfide is evolved in a state of high purity, substantially free of $SO_2$ and other hydrocarbon or non-hydrocarbon diluent gases, and is piped off for recovery of values (as, for instance, for conversion to elemental sulfur).

(b) The residue from step (a) now comprises a mixture of the alkali metal or alkali earth metal salts of inorganic and organic sulfuric and sulfonic acids with the residual hydrocarbon and carbonaceous components of the original sludge acid. This mixture is now heated, in a suitable oven, furnace or kiln, to a terminal temperature between 600° C. and 1300° C., whereupon the inorganic and organic sulfates and sulfonates are substantially quantitatively reduced by the hydrocarbon and carbonaceous components of the sludge acid to the corresponding alkali metal or alkali earth metal sulfides:

$$nM_2SO_4 + 2C_nH_{2n} \rightarrow nM_2S + 2nCO + 2nH_2O$$

$$3nM_2SO_4 + 4C_nH_{2n} \rightarrow 3nM_2S + 4nCO_2 + 4nH_2O$$

$$M_2SO_4 + 4C \rightarrow M_2S + 4CO$$

$$M_2SO_4 + 2C \rightarrow M_2S + CO_2$$

The organic sulfuric and sulfonic acids salts at the advanced temperature of the reaction, probably dissociate into olefins and alcohols and the corresponding alkali metal or alkali earth metal sulfates, and the latter inorganic sulfates are reduced to the corresponding inorganic sulfides by the organic components of the sludge.

The residue from this thermal reduction step, i. e. the alkali metal sulfide or alkali earth metal sulfide is now simply returned to the first step of the process, for reaction with a further quantity of waste sludge acid. This process is therefore cyclic in nature and, once started, may be carried on indefinitely with only small quantities of alkali metal sulfide or alkali earth metal sulfides or sulfates required as "make-up" for mechanical losses.

The gaseous by-products of this thermal reduction step consist primarily of carbon monoxide, with smaller quantities of carbon dioxide, volatilized hydrocarbons and traces of hydrogen sulfide and sulfur dioxide present. It has a high calorific value (about 200–250 B. t. u. per cubic foot) and may be used as a fuel gas. Thus, it may advantageously be used as a heating gas for the thermal reduction step (b) of this process. When this by-product gas is used as fuel to effect the reduction of the sulfate to sulfide, little or no additional fuel need be used in the process of this invention.

In effecting the first step of my new process, the waste sludge acid may be mixed with the alkali metal sulfide or the alkali earth metal sulfide, the latter being added as a solid, or in solution in water or as a slurry in water. A preferred method is to add the hot reduction product from the second step (i. e. the thermal reduction step) of the process to the waste sludge acid so that the residual thermal content of the reduction product may be used to advantage to accelerate and drive to completion the neutralization of the free sulfuric and sulfonic acids in the sludge. If the sludge is too thick or too viscous, it may be desirable to add water to the sludge, at least in a sufficient quantity to permit the ready mixing of the reagents and the complete neutralization of the free acid content. It may also be desirable to blend or mix sludges of various natures and origin to obtain a product which is sufficiently fluid to permit ready reaction with the alkali metal or alkali earth metal sulfide.

While the minimum of sulfide to be mixed with the sludge is that amount required completely to neutralize the free sulfuric and sulfonic acids, I have found it preferable to add a quantity equivalent to one mole of alkali metal or alkali earth metal sulfide for each mole of inorganic and organic free and combined $SO_3$ present in the sludge, so as to provide an adequate balance of anions and cations for complete conversion of the acid content of the sludge to alkali metal sulfide or alkali earth metal sulfide.

To effect complete reduction of the sulfate to sulfide during the thermal reduction, I have found that at least 0.35 lb. of organic matter (whether present as hydrocarbon or as carbonaceous matter) and preferably about 0.50 lb. of organic matter must be present in the original waste sludge acid for every pound of inorganic and organic free and combined $SO_3$ in the sludge. If the original sludge does not contain at least 0.35 lb. organic matter per pound of $SO_3$, it must first be adjusted to contain at least such amounts. This may be done by mixing sludges of various types and origins, by blending high residual hydrocarbon sludges with low residual hydrocarbon sludges. Alternately, the organic matter content of the sludge may be adjusted by the addition of petroleum or petroleum fractions, comminuted coal or coke, coaltar or coaltar fractions, pitch of petroleum, coaltar, vegetable or animal origin or, in fact, any inexpensive hydrocarbon, carbohydrate or carbonaceous material.

The reaction between the alkali metal or alkali earth metal sulfide and the acids in the sludge may be effected in any convenient vat, vessel, reactor or container. It proceeds quite rapidly at room temperature or above. The use of heat to drive the reaction to completion is optional. If the hot sulfide obtained from the reduction step is mixed with the sludge acid, the residual heat in the sulfide is more than sufficient to drive off all of the $H_2S$ evolved and in addition to dehydrate the residual mixture of alkali metal sulfate or alkali earth metal sulfate and organic material.

The hydrogen sulfide is evolved in a state of high purity, substantially free of diluents. This gas may be piped off and compressed or liquefied. Alternately, it may be used as a chemical reagent and raw material, e. g. in the manufacture of sodium sulfide, ammonium sulfide, sodium thiosulfate, cyclohexanone oxime from nitrocyclohexane, as a reducing agent, in various metallurgical processes, et cetera.

Probably the most logical outlet for the hydrogen sulfide produced in this process will be in the recovery of elemental sulfur (e. g. by partial combustion with air, by reaction with $SO_2$ from another source, by the Ferrox process, by the Nickel process or by the Thylox process (Cundall, Chem. and Met. Eng. 34, 143–7 (1927); Denig, Amer. Gas. Assoc. Proc., 1933, 903–12; Gollmar, Ind. Eng. Chem. 26, 130–2 (1934); Jacobson, Gas Age Record, 63, 597–600 (1929); Powell, Gas Age Record, 77, 711–715, 720 (1936), Sperr, Gas Age Record, 58, 73–6, 80 (1926); U. S. Patents 1,523,845 (1925) and 1,533,773 (1925); Powell, Ind. Eng. Chem., 31, 789–796 (1939); Canadian Chemical Processing, July 1952, 30–32; Sawyer, Hader, Herndon and Morningstar, Ind. Eng. Chem., 42, 1938–1950 (1950); Chance and Chance, English Patent 8666 of 1887; Claus, English Patent 5958 of 1883; Graff, Oil Gas Journal, 46, February 17, 1949; Lunge, Manufacture of Sulfuric Acid and Alkali, 2nd edition, London, vol. II (1895), ibid, 3rd edition, vol. II, Part II, 972 et seq. (1909)). By some of these processes, the sulfur may be recovered in an extremely fine particle size, rendering it particularly useful as an agricultural fungicide (Sauchelli, Ind. Eng. Chem., 25, 363–7 (1933)). It is thus possible to recover the sulfur from waste sludge acids in a form in which it is considerably more valuable than the original sulfuric acid from which it has ultimately been derived.

The second step of my new process (i. e. the thermal reduction of the alkali metal sulfate or alkali earth metal sulfate admixed with organic matter residual from the first step) may be effected in any suitable furnace, oven, reverberatory or regenerative furnace, stationary or rotary kiln, roaster, calciner, still, retort, boiler or tube furnace, which may be fired either directly or indirectly with coal, coke, petroleum or petroleum fractions, gas, wood or any convenient fuel. As previously indicated, the by-product gases of this reduction step has considerable caloric value and may be used to heat or fire the reaction mixture. The reduction of alkali metal sulfates and alkali earth metal sulfates with hydrocarbon or carbonaceous residues in the sludge acid is slow at 500° C., becomes more rapid at 600° C. to 750° C. and is usually complete at 800° C. to 900° C., although terminal temperatures as high as 1300° C. may be employed to obtain a very rapid reduction. Thus, excellent results are obtained by feeding the mixture of sulfate and organic matter to a rotary kiln, fired at least in part by the recycled kiln gases, to a terminal temperature of from 600° C. to 1300° C., and preferably from 800° C. to 900° C. At the latter temperatures, the rotary kiln is not excessively attacked by the hot sulfide since a coating of iron sulfide forms, largely passivating the surface of the kiln.

It is entirely feasible and practical to effect the process of this invention on a batchwise, semi-continuous or a continuous basis. The mixture of waste sludge acid and sulfide salt may be fed continuously to a reactor from which the evolved $H_2S$ is recovered and the residue of sulfate salt and organic matter is then fed continuously to a second reactor, such as a rotary kiln. In the second reactor, the mixture of sulfate salt and organic matter is reduced to sulfide salt and by-product gases. The sulfide salt (with "make-up" if necessary) is recycled to the beginning of the process and the by-product gases are utilized for their fuel value.

It is also entirely feasible to effect the entire process of this invention in a single reactor as, e. g., a rotary kiln. The mixture of sulfide salt and waste sludge acid may be fed to the kiln. In the "cold" end of the kiln, conversion to sulfate salt and evolution of $H_2S$ gas is rapidly completed. As the mixture of sulfate salt and organic matter travels to the "hot" end of the kiln, it is reduced back to sulfide salt and by-product gases. The gases from the kiln will thus contain hydrogen sulfide, carbon monoxide, carbon dioxide, and probably nitrogen, some volatilized hydrocarbons and traces of elemental sulfur. These gases may then be cooled and processed by any of the methods well known to the art for recovering $H_2S$ from gas mixtures or "sour" gases (Sawyer, Hader, Herndon and Morningstar, Ind. Eng. Chem., 42, 1938–1950 (1950)). The sulfide salt discharged from the "hot" end of the kiln is fed back, with more sludge acid, to the "cold" end of the kiln to make the process cyclic.

In small installations, the entire process of this invention may be effected in a single furnace, oven, retort, boiler, kiln or reactor. Thus, to the hearth of a furnace containing a quantity of sulfide salt may be added with good stirring the calculated amount of sludge acid, and the hydrogen sulfide evolved piped off and recovered. The residual mixture of sulfate salt and organic matter is then heated to a terminal temperature between 600° C. and 1300° C. (preferably between 800° C. and 900° C.) to regenerate the sulfide salt. The latter is then reacted with another batch of sludge acid and the process is repeated. Thus, the recycling sulfide-sulfate salts are actually never removed from the immediate vicinity of the hearth of the furnace, and mechanical losses kept to a minimum. Gas evolved during the reduction step may be used to underfire the furnace.

The alkali metal sulfides or alkali earth metal sulfides obtained by this process are usually free of carbon, the totality of the hydrocarbon and carbonaceous content of the sludge acid having been volatilized as CO and $CO_2$. However, with sludge acids of high residual hydrocarbon content (i. e. in excess of the amount required to reduce sulfate to sulfide), the sulfide is often obtained admixed with some carbonaceous residue. This in no way interferes with the recycling of the sulfide to the first step of the process. As the carbonaceous residue continually recycles in the process, the carbon content of the recycled sulfide will also increase. At periodic intervals (e. g. each third cycle, each fifth cycle, each tenth cycle, etc.), it is therefore desirable to separate the accumulated carbon from the sulfide salt. This may be effected very simply by slurrying the sulfide-carbon mixture with water. If an alkali earth metal sulfide (e. g. calcium sulfide, barium sulfide, strontium sulfide) is used in the process, the alkali earth metal sulfide forms a fine dispersion in the water which can readily be decanted or filtered from the denser and more compact carbonaceous material. If an alkali metal sulfide (e. g. sodium sulfide, potassium sulfide, lithium sulfide) is used in the process, the sulfide dissolves readily in the water and is very easily decanted or filtered from the insoluble carbonaceous material. The solution or suspension of sulfide thus obtained is then returned to the first step of the process for re-use in the usual manner. The carbonaceous residue thus obtained assays as a potential by-product about 6%–10% sulfur, about 80%–85% carbon, and is roughly similar to petroleum coke in composition and appearance.

On the basis of reagent economies in the process of this invention, it is desirable to use either sodium sulfide or calcium sulfide as the recycling salt. The sulfides of lithium, potassium, barium and strontium are considerably more expensive, so that costs of "make-up" salts would be correspondingly higher. Sodium sulfide has the advantage of being water-soluble and hence more easily separated from the carbonaceous residue in the periodic separation above described. Calcium sulfide has the advantage of a lower alkalinity and a less marked attack on the materials of construction of the kiln. "Make-up" in either case may be effected by the periodic addition of sodium sulfate (Glauber's salts, salt cake) or calcium sulfate (gypsum, anhydrite, chemical by-product $CaSO_4$, etc.) to the mixture prior to the thermal reduction step.

The following examples are given to define and to illustrate this invention but in no ways to limit it to reagents, proportions or conditions described therein. Obvious improvements will occur to any person skilled in the art.

*Example I*

A light lubricating oil sludge containing 45% of combined $SO_3$ (as inorganic and organic sulfuric and sulfonic acids) and 20% of hydrocarbon pitch is processed. To 1000 kgs. of this sludge (containing 5.602 kg. moles of $SO_3$), there is added in small portions 480 kgs. of hot calcine containing 92% of $Na_2S$ (i. e. 442 kgs. $Na_2S$ (5.667 kg. moles)). The hydrogen sulfide evolved is pumped off and recovered. (Yield—165 kg. $H_2S$.) The residue is fed continuously to a rotary kiln where it is gas fired to a terminal temperature of 800°–900° C. for a residence period of 30 to 45 minutes. There is thus obtained 470 kgs. of hot calcine assaying 92% of $Na_2S$ which is returned to the first step of the process. By the addition of 19 kgs. of salt cake to each 1000 kg. batch of sludge, the losses of sodium sulfide in each cycle may be compensated. Efficiency of sulfur recovery—91.6%. The kiln gas has a caloric value of 266 B. t. u. per cubic foot.

*Example II*

A sludge acid from the purification of coal tar distillates containing 40% $SO_3$ and 6.6% of naphthalene, pitch and other hydrocarbon oils is processed. Because of the deficiency of reducing organic matter in this waste sludge acid, it is mixed with an additional quantity of coal tar pitch (10% on the weight of the sludge) to bring the proportion of organic matter up to 41.5% of the $SO_3$ content of the sludge. To 1100 kgs. of this adjusted sludge (1000 kgs. original sludge) (containing 5.00 kg. moles of $SO_3$), there is added in small portions 450 kgs. of hot calcine containing 80% of CaS (i. e. 360 kgs. CaS (5.00 kg. moles)). The hydrogen sulfide evolved is pumped off and recovered. (Yield—141 kgs.) The residue is fed continuously to a rotary kiln where it is gas fired to a terminal temperature of 750°–850° C. for a residence period of 45 to 60 minutes. There is thus obtained 432 kgs. of hot calcine assaying 80% of CaS, which is returned to the first step of the process. By the addition of 43 kgs. of gypsum ($CaSO_4 \cdot 2H_2O$) to each 1000 kg. batch of sludge, the losses of calcium sulfide in each cycle may be compensated. Efficiency of sulfur recovery—88.1%.

*Example III*

A heavy lubricating oil sludge containing 40% $SO_3$ and 40% pitch and other hydrocarbons is processed. To 1000 kgs. of hot sludge (containing 5.00 kg. moles of $SO_3$) there is added in small portions with good mixing a solution of 400 kgs. of sodium sulfide (5.13 moles) in 800 kgs. of water. The hydrogen sulfide evolved is pumped off and recovered. (Yield—145 kgs.) The residue is fed continuously to a rotary kiln where it is gas fired to a terminal temperature of 800°–900° C. for a residence period of 30 to 45 minutes. There is thus obtained 470 kgs. of a hot calcine assaying 82% $Na_2S$ and 9% of carbonaceous material (i. e. 385 kgs. $Na_2S$). This calcine is recycled to the process five times, with the addition of 28 kgs. salt cake per cycle as "makeup." After the fifth recycling, the calcine will contain 40%–43% of carbonaceous material. This hot calcine is leached with 820 kgs. of water, and is then filtered. The filtrate is a solution of 400 kgs. $Na_2S$ in 800 kgs. water, which is then recycled to the first step of this process. Efficiency of sulfur recovery—90.6%.

Having described my invention, what I claim and desire to protect by Letters Patent is:

1. A process for the recovery of values from waste sludge acid which comprises the steps of: (a) reacting the waste sludge acid containing free sulfuric acid, organic sulfuric acids, organic sulfonic acids and carbonaceous material with a member of the group consisting of the sulfides of the alkali metals and recovering the hydrogen sulfide evolved, and (b) heating the residual mixture of carbonaceous material and at least one member of the group consisting of the alkali metal inorganic and organic sulfates and sulfonates obtained in step (a) to a terminal temperature of between 600° C. to 1300° C. and recovering thereby the corresponding member of the group consisting of the sulfides of the alkali metals which is returned to step (a) of the process.

2. The process of claim 1 applied to the waste sludge acids from the processing of petroleum products.

3. The process of claim 1 applied to the waste sludge acids from the processing of coal tar distillates.

4. The process of claim 1 wherein the quantity of the member of the group consisting of the sulfides of the alkali metals is at least sufficient to neutralize all of the free inorganic and organic sulfuric and sulfonic acids in the sludge.

5. The process of claim 1 wherein the quantity of the member of the group consisting of the sulfides of the alkali metals is at least equimolar in amount to the total of free and combined inorganic and organic $SO_3$ content of the sludge acid.

6. The process of claim 1 applied to sludges containing at least 0.35 part by weight of carbonaceous organic matter for each 1.00 part by weight of free and combined inorganic and organic sulfur trioxide.

7. The process of claim 1 applied to sludges containing about one half part by weight of carbonaceous matter for each part by weight of free and combined inorganic and organic sulfur trioxide.

8. The process of claim 1 applied to sludges which are adjusted by addition of carbonaceous organic matter to a content of at least 0.35 part by weight of carbonaceous organic matter for each 1.00 part by weight of free and combined inorganic and organic sulfur trioxide.

9. The process of claim 1 wherein the thermal reduction step (b) is effected at a terminal temperature of 800° C. to 900° C.

10. The process of claim 1 effected in rotary kilns.

11. The process of claim 1 wherein the recycling sulfide salt is periodically separated from the accumulated carbonaceous material.

12. The process of claim 1 wherein the recycling sulfide salt is periodically separated from the accumulated carbonaceous material by mixing the sulfide salt with water and separating the insoluble carbonaceous material from the concomitant aqueous solution or suspension of sulfide salt.

13. The cyclic process of claim 1 wherein the circulating sulfide salt is sodium sulfide.

14. The process of claim 1 applied to the recovery of elemental sulfur from the hydrogen sulfide evolved in step (a).

References Cited in the file of this patent

UNITED STATES PATENTS

| | | |
|---|---|---|
| 1,945,163 | Rosenstein | Jan. 30, 1934 |
| 2,055,419 | Rosenstein | Sept. 22, 1936 |
| 2,394,470 | O'Shaughnessy | Feb. 5, 1946 |